United States Patent
Caron et al.

(10) Patent No.: US 11,454,743 B2
(45) Date of Patent: Sep. 27, 2022

(54) OPHTHALMIC LENS HAVING INCREASED RESISTANCE TO HOT AND HUMID ENVIRONMENT

(71) Applicants: CORPORATION DE L'ECOLE POLYTECHNIQUE DE MONTREAL, Montreal (CA); ESSILOR INTERNATIONAL, Charenton-le-Pont (FR)

(72) Inventors: Martin Caron, Montreal (CA); Karin Scherer, Charenton-le-Pont (FR); Oleg Zabeida, Montreal (CA); Ludvik Martinu, Montreal (CA); Jolanta Klemberg-Sapieha, Montreal (CA); Thomas Schmitt, Montreal (CA)

(73) Assignees: CORPORATION DE L'ECOLE POLYTECHNIQUE DE MONTREAL, Montreal (CA); ESSILOR INTERNATIONAL, Charenton-le-Pont (FR)

( * ) Notice: Subject to any disclaimer, the term of this patent is extended or adjusted under 35 U.S.C. 154(b) by 749 days.

(21) Appl. No.: 16/327,496

(22) PCT Filed: Aug. 21, 2017

(86) PCT No.: PCT/EP2017/071028
§ 371 (c)(1),
(2) Date: Feb. 22, 2019

(87) PCT Pub. No.: WO2018/036963
PCT Pub. Date: Mar. 1, 2018

(65) Prior Publication Data
US 2019/0170912 A1    Jun. 6, 2019

(30) Foreign Application Priority Data
Aug. 23, 2016  (EP) ..................... 16306076

(51) Int. Cl.
*G02B 1/14* (2015.01)
*G02B 1/115* (2015.01)
(Continued)

(52) U.S. Cl.
CPC ................ *G02B 1/14* (2015.01); *G02B 1/115* (2013.01); *G02C 7/022* (2013.01); *G02B 1/111* (2013.01)

(58) Field of Classification Search
CPC .......... G02B 1/14; G02B 1/115; G02B 1/111; G02C 7/022
See application file for complete search history.

(56) References Cited

U.S. PATENT DOCUMENTS 6,919,134 B2    7/2005  Mitsuishi et al.
2014/0354945 A1   12/2014  Martinu et al.

FOREIGN PATENT DOCUMENTS

| EP | 1433809 | 6/2004 | |
| EP | 1433809 A1 * | 6/2004 | ............ G02B 1/111 |
| WO | WO 2015/166144 | 11/2015 | |

OTHER PUBLICATIONS

"Young's Modulus" Retrieved from the internet on Jan. 6, 2016, last edited Dec. 2012, URL < https://en.wikipedia.org/w/index.php?title=Young%27s_modulus&oldid=529232815 >.

(Continued)

*Primary Examiner* — James C. Jones
(74) *Attorney, Agent, or Firm* — Norton Rose Fulbright US LLP

(57) ABSTRACT

The invention concerns an ophthalmic lens having an increased resistance to thermal and hygroscopic stresses, said ophthalmic lens comprising a substrate, at least one main face of which is coated with a siloxane-based anti-abrasion hardcoat, characterized in that said ophthalmic lens further comprises at least one protective layer of an organic- (Continued)

inorganic material directly in contact with said hardcoat, said protective layer of organic-inorganic material having a Young's modulus higher than 20 GPa, preferably of at least 25 GPa.

20 Claims, 1 Drawing Sheet

(51) Int. Cl.
    *G02C 7/02*       (2006.01)
    *G02B 1/111*     (2015.01)

(56) References Cited

OTHER PUBLICATIONS

International Search Report and Written Opinion issued in International Patent Application No. PCT/EP2017/071028, dated Oct. 30, 217.

McKee et al., "Indentation Versus Tensile Measurements of Young's Modulus for Soft Biological Tissues" *Tissue Engineering Part B*, 2011, 17(3): 155-164.

\* cited by examiner

OPHTHALMIC LENS HAVING INCREASED RESISTANCE TO HOT AND HUMID ENVIRONMENT

CROSS-REFERENCE TO RELATED APPLICATIONS

This application is a national phase application under 35 U.S.C. § 371 of International Application No. PCT/EP2017/071028 filed 21 Aug. 2017, which claims priority to European Patent Application No. 16306076.7 filed 23 Aug. 2016. The entire contents of each of the above-referenced disclosures is specifically incorporated by reference herein without disclaimer.

FIELD OF THE INVENTION

The present invention concerns in general an ophthalmic lens having an increased resistance to thermal and hygroscopic stresses, especially an ophthalmic lens comprising a siloxane-based anti-reflective hardcoat as well as a process for increasing the resistance of an ophthalmic lens, in particular comprising a siloxane-based anti-abrasion hardcoat, to thermal and hygroscopic stresses such as those induced by a hot and humid environment.

DESCRIPTION OF RELATED ART

Generally, an ophthalmic lens comprises a substrate on which different functionalized coatings may be deposited.

Most often, this substrate is an organic substrate made of thermoplastic or thermosetting plastic material. These materials have the disadvantage of being easily scratched.

That is why, it is common to coat this lens substrate with an anti-abrasion and/or scratch-resistant coating (hardcoat). These hardcoats are usually based on poly(meth)acrylates or siloxanes, preferably siloxanes, and generally comprise one or more mineral fillers intended to increase the hardness and/or the refractive index of the hardcoat once cured.

An interferential coating such as an antireflective coating may be applied to the above hard coated lens.

Indeed, it is known to treat ophthalmic lenses, whether inorganic or organic, so as to prevent the formation of annoying interfering reflections for the wearer of the lens and his or her interlocutors. In such a case, the lens is provided with a monolayer or multilayer antireflection coating, generally of mineral material.

In particular, an interferential coating, especially a multilayer antireflection coating is formed by alternating layers of dielectric materials having high refractive index (named hereafter HI layer) and low refractive index (named hereafter LI layer), that will produce interferential coating which will reduce reflectance and at the same time increase transmittance. HI layer is traditionally made of one or more metal oxides, such as zirconia ($ZrO_2$), titanium dioxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium oxide ($Nb_2O_5$), yttrium oxide ($Y_2O_3$); whereas LI layer may comprise $SiO_2$, or a mixture of silica and alumina.

EP-1.433.809 discloses antireflection coating comprising hybrid layers formed of at least one inorganic substance selected from silicon dioxide, aluminum oxide, titanium oxide, zirconium oxide, tantalum oxide, yttrium oxide and niobium oxide and an organosilicon compound that is liquid at normal temperature and at atmosphere pressure and/or an organic compound not containing silicon that is a liquid at normal temperature and at atmosphere pressure as vapor deposition raw materials.

It is indicated that the resulting antireflection coating has excellent abrasion resistance, impact resistance, adhesiveness, heat resistance and alkali resistance.

U.S. Pat. No. 6,919,134 discloses the use of similar hybrid layers for forming antireflection coating having improved flexibility.

The inventors have found that siloxane-based antiabrasion hardcoats are very sensitive to thermal and hygroscopic stresses and develop very visible cracks when placed in a hot and humid environment (typically 60-80° C.; 80-100% RH). The same is true when the antiabrasion hardcoat is coated with an interferential stack such as an antireflection stack, in particular formed of inorganic layers.

Therefore, the aim of the invention is to provide an ophthalmic lens comprising a substrate on at least a main face of which there is formed a siloxane-based antiabrasion hardcoat which has increased resistance to thermal and hygroscopic stresses, in particular which has improved resistance to crack occurrence in the hardcoat when placed in a hot and humid environment.

A further object of the invention is to provide a process for increasing the resistance to thermal and hygroscopic stresses in an ophthalmic lens comprising a siloxane-based antiabrasion hardcoat, and, in particular, which increases the resistance to crack occurrence within the said hardcoat when the ophthalmic lens is placed in a hot and humid environment.

SUMMARY OF THE INVENTION

Specifically, the inventors have discovered that by forming directly on the siloxane-based antiabrasion hardcoat of an ophthalmic lens a protective layer of an organic-inorganic material having a Young's modulus higher than 20 GPa, preferably of at least 25 GPa, the resulting ophthalmic lens has increased resistance to crack occurrence within the hardcoat when the ophthalmic lens is subjected to thermal and hygroscopic stresses, as when placed in a hot and humid environment, typically an environment at a temperature of 60-80° C. and 80-100% of relative humidity (RH).

The targeted aim is therefore achieved according to the invention by an ophthalmic lens comprising a substrate, at least one main face of which is coated with a siloxane-based antiabrasion hardcoat, and at least one protective layer of an organic-inorganic material directly in contact with said hardcoat, said protective layer of organic-inorganic material having a Young's modulus higher than 20 GPa, preferably of at least 25 GPa.

In order to avoid or at least limit the occurrence of cracks in the protective layer of organic-inorganic material itself, when the ophthalmic lens is subjected to a hot and humid environment, the Young's modulus of the layer of organic-inorganic material shall preferably not exceed 40 GPa, better 35 GPa and even better 30 GPa. These ranges relate especially to a protective layer base on an organic-inorganic SiOCH protective layer.

Preferably for ZrOSiCH, the Young's modulus of the layer of organic-inorganic material shall preferably not exceed 60 GPa.

The indentation hardness (H)/Young's modulus (E) ratio of the protective layer of organic-inorganic material is at least 0.11 or higher, for example 0.12, 0.13 or even higher, especially when the organic/inorganic layer is a low index layer deposited in absence of inorganic precursor, for avoiding or at least limiting the occurrence of cracks both in the antiabrasion hardcoat and the protective layer of organic-inorganic material itself when the ophthalmic is subjected to a hot and humid environment.

A layer of an organic-inorganic material is preferably a layer based on compounds containing carbon atoms and metal or metalloid atoms.

Preferably, the organic-inorganic layer comprises carbon atoms, oxygen atoms and metal or metalloid atoms.

Preferably, the said protective layer of an organic-inorganic material results from the deposition of an organosilicon compound or a mixture of organosilicon compounds in gaseous state, optionally in presence of a mineral precursor. By mineral precursor in the present invention, it is meant a mineral compound which may or not be reactive with other species present during vapor deposition.

Preferably, the said protective layer of an organic-inorganic material results from the sole vapor deposition of an organosilicon compound or a mixture of organosilicon compounds, i.e. in the absence of any mineral precursor, and preferably in absence of any other organic compound.

Preferably, the vapor deposition is made under ion beam assistance. Preferably, activated species (such as ions or radicals) issued from the organosilicon compounds are created under the ion beam assistance.

The ophthalmic lens according to the invention may also comprise an interferential stack, such as an antireflective stack formed on the said protective layer of organic-inorganic material.

In some embodiments, the said protective layer of organic-inorganic material constitutes the first layer, usually of low refractive index, of the interferential stack, preferably an antireflective stack.

In a specific embodiment, the interferential stack, preferably an antireflective stack comprises at least one inorganic layer inserted between two layers of organic-inorganic material, the layer of organic-inorganic material in direct contact with the hardcoat constituting the protective layer of organic-inorganic material according to the invention.

In another embodiment, the interferential stack, preferably the antireflective stack, is solely comprised of layers made of an organic-inorganic material as defined above, a layer of the stack constituting the protective layer of organic-inorganic material in direct contact with the hardcoat, said layer being generally a LI layer.

The invention also relates to a process for increasing the resistance to thermal and hygroscopic stresses of an ophthalmic lens comprising a substrate, at least one main face of which is coated with a siloxane-based antiabrasion hardcoat, which comprises depositing directly on said hardcoat a protective layer of an organic-inorganic material having a Young's modulus higher than 20 GPa, preferably of at least 25 GPa.

DETAILED DESCRIPTION OF THE INVENTION AND PREFERRED EMBODIMENTS

Figure 1:
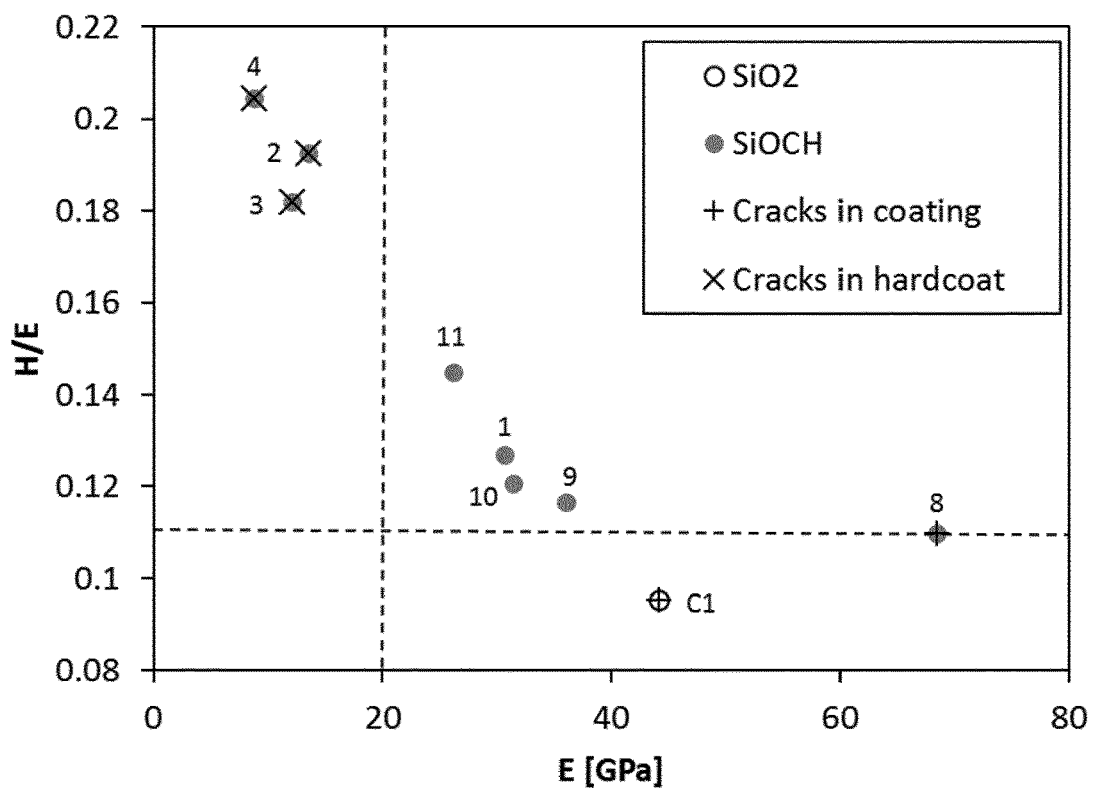
FIG. 1 is a graph of the ratio indentation hardness (H)/Young's modulus (E) in function of the Young's modulus (E) of samples of ophthalmic lenses according to the invention, and comparative examples which have been subjected to a humidity test (80° C.; 100% RH) for 90 hours.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof, although it preferably precludes the presence of one or more other features, steps or components or groups thereof. As a result, a method, or a step in a method, that "comprises," "has," "contains," or "includes" one or more steps or elements, possesses those one or more steps or elements, but is not limited to possessing only those one or more steps or elements, although it preferably possesses only those steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values «from X to Y» or "between X to Y", according to the present invention, means as including the values of X and Y.

In the present application, when an ophthalmic lens comprises one or more coatings onto the surface thereof, the expression "to deposit a layer or a coating onto the article" is intended to mean that a layer or a coating is deposited onto the external (exposed) surface of the outer coating of the article, that is to say its coating which is the most distant from the substrate.

A coating, that is said to be "on" a substrate or deposited "onto" a substrate is defined as a coating, which (i) is positioned above the substrate, (ii) is not necessarily, although it is preferably, in contact with the substrate, that is to say one or more intermediate coatings may be arranged between the substrate and the coating in question, and (iii) does not necessarily completely cover the substrate (although it preferably completely covers the substrate).

In a preferred embodiment, the coating on a substrate or deposited onto a substrate is in direct contact with this substrate.

When "a layer 1 is lying under a layer 2", it is intended to mean that layer 2 is more distant from the substrate than layer 1.

The ophthalmic lens according to the invention comprises a transparent substrate having two opposite main faces, at least one of which is coated with a siloxane-based antiabrasion and/or antiscratch coating, hereinafter designated as hardcoat (HC).

The substrate of the lens according to the invention is preferably an organic substrate, for example made of thermoplastic or thermosetting plastic. This substrate may be chosen from the substrates mentioned in patent application WO 2008/062142.

In particular, thermoplastic materials may be selected from, for instance: polyamides, polyimide, polysulfones, polycarbonates and copolymers thereof, poly(ethylene terephtalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (such as CR 39®); homo- and copolymers of (meth)acrylic acid and esters thereof, which may be derived from bisphenol A; polymer and copolymer of thio (meth)acrylic acid and esters thereof, polymer and copolymer of allyl esters which may be derived from Bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

Homopolymers of diethylene glycol bis(allyl carbonate) (such as CR 39®), allylic and (meth)acrylic copolymers, having a refractive index between 1.54 and 1.58, are preferred.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Particularly recommended substrates include those substrates obtained through (co)polymerization of the diethyleneglycol bis-allyl-carbonate, marketed, for example, under the trade name CR-39® by the PPG Industries company, (examples of such kind of lenses are ORMA® lenses, ESSILOR), or through polymerization of the thio(meth) acrylate monomers, such as those described in the application of the French patent FR 2 734 827, or polythiourethanes The substrates may be obtained through polymerization of the above monomer combinations, or may further comprise mixtures of such polymers and (co)polymers.

Siloxane-based antiabrasion and/or antiscratch hardcoats are well known in the art.

Typically, such antiabrasion and/or antiscratch hardcoats are obtained from compositions comprising at least one alkoxysilane and/or hydrolysate thereof, obtained for example by hydrolysis with an hydrochloric acid solution. After hydrolysis step, which generally lasts for 1 h to 24 h, preferably 2 to 6 h, condensation and/or curing catalysts can facultatively be added. A surfactant compound is also preferably added to improve optical quality of the deposit. Usually, the compositions comprise colloidal silica.

Among the recommended antiabrasion and/or antiscratch hardcoats, there may be cited the hardcoats elaborated from epoxy-silanes such as those disclosed in EP-0.614.957, U.S. Pat. Nos. 4,211,833 and 5,016,523.

Numerous examples of condensation and/or curing are given in the publications "Chemistry and Technology of the Epoxy Resins", B. Ellis (Ed.), Chapman Holl, New York, 1993 and "Epoxy resins and Technology", 2$^{nd}$ Edition C. A. May (Ed.) Marcel Dekker, New York, 1988.

A preferred composition for antiabrasion and/or antiscratch hardcoat is the composition disclosed in EP-0.614.957. It comprises a hydrolysate of trialkoxysilane and dialkyl dialkoxysilane, colloidal silica and a catalytic amount of an aluminum based curing catalyst such as aluminum acetyl acetonate. The remaining being essentially solvents classically used for formulating such compositions.

Preferably, the used hydrolysate is hydrolysate of α-glycidiloxy propyl trimethoxy silane (GLYMO) and dimethyldiethoxysilane (DMDES).

The antiabrasion and/or antiscratch hardcoat composition can be deposited on the main face of the substrate by dipping or centrifugation. It is then cured in an appropriate manner (preferably heating and/or UV irradiation).

Thickness of the antiabrasion and/or antiscratch hardcoat ranges typically from 2 to 10 µm, preferably 3 to 5 µm.

Prior to the deposition of the hardcoat, there is usually deposited on the substrate main face an impact-resistance primer.

Preferred impact-resistance primer compositions are thermoplastic polyurethane based compositions, as those disclosed in JP-63-141001 and JP-63-87223, poly(meth)acrylic compositions, as those disclosed in U.S. Pat. No. 5,015,523, thermohardening polyurethane based composition, as those disclosed in EP-0.404.111, and poly(meth)acrylic latex or polyurethane latex based composition as those disclosed in U.S. Pat. No. 5,316,791 and EP-0.680.492. Examples of polyurethane lattices are W234™ and W240™ from Baxenden.

These primer compositions are deposited by dipping or centrifugation and heat cured.

According to the invention, a protective layer made of an organic-inorganic material is directly formed on the siloxane-based hardcoat in order to increase the resistance of the hardcoat to thermal and humidity stresses such as those encountered when the ophthalmic lens is placed in a hot and humid environment.

According to the invention, the protective layer of organic-inorganic material in direct contact with the hardcoat is obtained by depositing, under an ion beam, activated species originating from at least one organic precursor or mixture of organic precursors, in gaseous form, which preferably comprises in its structure carbon atom(s), oxygen atom(s), metal and/or metalloid atom(s) or mixtures thereof.

Preferably, the organic precursor comprises an organosilicon compound or mixtures of organosilicon compounds.

Non-limiting examples of organic precursor compounds, cyclic or noncyclic, are the following compounds: octamethylcyclotetrasiloxane (OMCTS), decamethylcyclopentasiloxane, dodecamethylcyclohexasiloxane, hexamethyl cyclotrisiloxane, hexamethyldisiloxane (HMDSO), octamethyltrisiloxane, decamethyltetrasiloxane (DMTS), dodecamethylpentasiloxane, tetraethoxysilane, vinyltrimethylsilane, hexamethyldisilazane, hexamethyldisilane, hexamethylcyclotrisilazane, vinylmethyldiethoxysilane, divinyltetramethyldisiloxane, tetramethyldisiloxane, polydimethylsiloxane (PDMS), poly-phenylmethylsiloxane (PPMS) or a tetraalkylsilane such as tetramethylsilane.

Preferably, the organic precursor comprises at least one silicon atom carrying at least one alkyl group, preferably a C1-C4 group, more preferably at least one silicon atom bearing one or two alkyl groups identical or different, preferably a C1-C4 group, for example a methyl group.

Preferred organic precursor compounds comprise a Si—O—Si group, preferably a divalent group of formula (3):

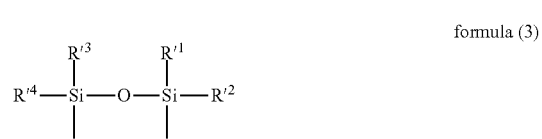

formula (3)

wherein R'¹ to R'⁴ independently denote linear or branched alkyl or vinyl groups, preferably C1-C4, groups, for example a methyl group, monocyclic or polycyclic aryl groups, hydroxyl or hydrolysable groups. Non-limiting examples of hydrolysable groups include H, halogen (chloro, bromo, iodo . . . ), alkoxy, aryloxy, acyloxy, —NR¹R² wherein R¹ and R² independently denote a hydrogen atom, an alkyl or aryl group, and —N(R³)Si where R³ is a hydrogen atom, a linear or branched alkyl group, preferably C1-C4 alkyl group or an aryl, monocyclic or polycyclic group, preferably monocyclic. The groups with a Si—O—Si bond are not considered as "hydrolyzable groups" within the meaning of the invention. The preferred hydrolyzable group is the hydrogen atom.

According to another embodiment, the organic precursor has the formula:

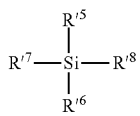

wherein R'⁵, R'⁶, R'⁷, R'⁸ independently denote hydroxyl groups or hydrolysable groups such as OR groups, wherein R is an alkyl group.

According to another embodiment of the invention, the organic precursor comprises at least one silicon atom carrying two identical or different alkyl groups, preferably a C1-C4 alkyl group. According to this first embodiment, the organic precursor is preferably a compound of formula (3) wherein R'¹ to R'⁴ independently denote alkyl groups, preferably a C1-C4 alkyl group, for example a methyl group.

Preferably, the one or more silicon atoms of the organic precursor contain no hydrolyzable group or hydroxyl group in this embodiment.

Preferably, the one or more silicon atoms of the organic precursor is preferably bound only to alkyl groups and/or groups having —O—Si or —NH—Si to form an Si—O—Si or Si—NH—Si group. The preferred organic precursor compounds are DMTS, OMCTS and HMDSO.

In an embodiment, precursors are cyclic polysiloxanes of formula (4):

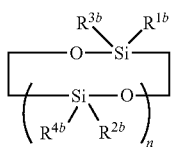

formula (4)

where n denotes an integer ranging from 2 to 20, preferably 3 to 8, R1b to R4b independently represent linear or branched alkyl groups, preferably C1-4 group (e.g. methyl), vinyl, aryl or a hydrolyzable group. The preferred members of this group are the octa-alkylcyclotétrasiloxanes (n=3), preferably octamethylcyclotetrasiloxane (OMCTS). In some cases, the layer is derived from a mixture of a number of compounds of formula (4) wherein n can vary within the limits indicated above.

In another embodiment, the organic precursor or mixture of organic precursors, contains in its structure at least one Si—X group, where X is a hydroxy group or a hydrolyzable group chosen from the groups H, halogen, alkoxy, aryloxy, acyloxy, —NR¹R² where R¹ and R² designate independently a hydrogen atom, an alkyl group or an aryl group, and —N(R³)—Si where R³ designates an alkyl group or an aryl group or a hydrogen atom; at least one carbon atom; at least one hydrogen atom; and, optionally, at least one nitrogen atom and/or at least one oxygen atom. The definition of the groups —NR¹R² and —N(R³)—Si indicated above naturally excludes compounds such as hexamethyldisilazane.

The organic precursor or mixture of organic precursors preferably contains in its structure at least one Si—H group, i.e. is a silicon hydride. Preferably, the silicon atom of the group Si—X is not bonded to more than two non-hydrolyzable groups such as alkyl or aryl groups.

Among the groups X: the acyloxy groups have the formula —O—C(O)R⁴ where R⁴ is a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups; the aryloxy and alkoxy groups have the formula —O—R⁵ where R⁵ is a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups; the halogens are preferably F, Cl, Br or I; the groups X of formula —NR¹R² may designate an amino group NH₂ or an alkylamino, arylamino, dialkylamino or diarylamino group; R¹ and R² independently designate a hydrogen atom, a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups; and the groups X of formula —N(R³)—Si are attached to the silicon atom by way of their nitrogen atom and their silicon atom naturally comprises three other substituents, where R³ designates a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups.

The preferred acyloxy group is the acetoxy group. The preferred aryloxy group is the phenoxy group. The preferred halogen is Cl. The preferred alkoxy groups are the methoxy and ethoxy groups.

In an embodiment, the organic precursor or mixture of organic precursors contains at least one nitrogen atom and/or at least one oxygen atom and preferably at least one oxygen atom.

The organic precursor or mixture of organic precursors preferably contains at least one silicon atom bearing at least one preferably C1-C4 alkyl group, better still at least one silicon atom bearing one or two identical or different preferably C1-C4 alkyl groups, and a group X (preferably a hydrogen atom) directly bonded to the silicon atom, X having the meaning indicated above. The preferred alkyl group is the methyl group. The vinyl group may also be used instead of an alkyl group. Preferably, the precursor or mixture of organic precursors comprises at least one Si—C bond and better still the silicon atom of the group Si—X is directly bonded to at least one carbon atom.

Preferably, each silicon atom of the precursor or mixture of organic precursors is not directly bonded to more than two groups X, better still is not directly bonded to more than one group X (preferably a hydrogen atom), and better still, each silicon atom of the precursor or mixture of organic precursors is directly bonded to a single group X (preferably a hydrogen atom). Preferably, the precursor or mixture of organic precursors has a Si/O atomic ratio equal to 1. Preferably, the precursor or mixture of organic precursors has a C/Si atomic ratio <2, preferably ≤1.8, better still ≤1.6 and even better still ≤1.5 or ≤1.3 and optimally equal to 1. Again preferably, the precursor or mixture of organic precursors has a C/O atomic ratio equal to 1. According to one embodiment, the precursor or mixture of organic precursors does not comprise a Si—N group and better still does not comprise any nitrogen atoms.

The silicon atom or atoms of the precursor compound of the multilayered interferential coating are preferably only bonded to alkyl groups, hydrogen and/or groups containing an —O—Si or —NH—Si chain so as to form a Si—O—Si or Si—NH—Si group. In one embodiment, the precursor or mixture of organic precursors contains at least one Si—O—Si—X group or at least one Si—NH—Si—X group, X having the meaning indicated above and preferably representing a hydrogen atom.

The organic precursor or mixture of organic precursors of the multilayered interferential coating preferably contain a Si—O—Si group and more preferably a group of formula:

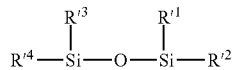

wherein R'1 to R'4 are independently linear or branched alkyl or vinyl groups, monocyclic or polycyclic aryl, hydroxyl groups or hydrolyzable groups.

According to another embodiment, the precursor or mixture of organic precursors may be a cyclic polysiloxane of formula:

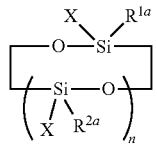

where X has the meaning indicated above and preferably represents a hydrogen atom, n designates an integer ranging from 2 to 20 and preferably from 3 to 8, and $R^{1a}$ and $R^{2a}$ independently represent a preferably C1-C4 alky group (for example the methyl group) or a vinyl or aryl group or a hydrolyzable group. Non-limiting examples of hydrolyzable groups for $R^{1a}$ and $R^{2a}$ are the chloro, bromo, alkoxy, acyloxy, aryloxy and H groups. The most common members belonging to this group are the tetra-, penta- and hexaalkylcyclotetrasiloxanes, preferably the tetra-, penta- and hexa-methylcyclotetrasiloxanes, 2,4,6,8-tetramethylcyclotetrasiloxane (TMCTS) being the preferred compound.

According to another embodiment, the precursor or mixture of organic precursors may be a linear alkylhydrosiloxane, better still a linear methylhydrosiloxane, such as for example 1,1,1,3,5,7,7,7-octamethyl tetrasiloxane, 1,1,1,3,5, 5,5-heptamethyltrisiloxane or 1,1,3,3,5,5-hexamethyl trisiloxane.

Non-limiting examples of cyclic or non cyclic organic precursor compounds, in are the following compounds: 2,4,6,8-tetramethylcyclotetrasiloxane (TMCTS of formula (1)) The tétraéthylcyclotétrasiloxane 2,4,6,8-, 2,4,6, 8-tétraphénylcyclotétrasiloxane the 2,4,6,8-tétraoctylcyclotétrasiloxane the 2,2,4,6,6,8-hexaméthylcyclotétrasiloxane the 2,4,6-trimethylcyclotrisiloxane, cyclotetrasiloxane, 1, 3,5,7,9-pentamethyl cyclopentasiloxane, the hexaméthylcyclohexasiloxane-2,4,6,8,10, 1, 1, 1, 3,5,7, 7,7-octamethyl cyclotetrasiloxane, 1, 1, 3,3,5,5-hexamethyltrisiloxane, tetramethyldisiloxane, tetraethoxysilane, vinylmethyldiethoxysilane, a hexamethylcyclotrisilazane such as hexamethylcyclotrisilazane 3,4,5,6 or 2, 2,4,4,6,6-hexamethylcyclotrisilazane, 1, 1, 1, 3,5,5,5-heptamethyl trisiloxane, tris (trimethylsiloxy) silane (formula (2)), 1, 1, 3, 3-tetramethyldisilazane, 1, 2,3,4,5,6,7,8-octamethylcyclotetrasilazane, the nonamethyl trisilazane, tris (dimethylsilyl) amine, hexamethyldisilazane.

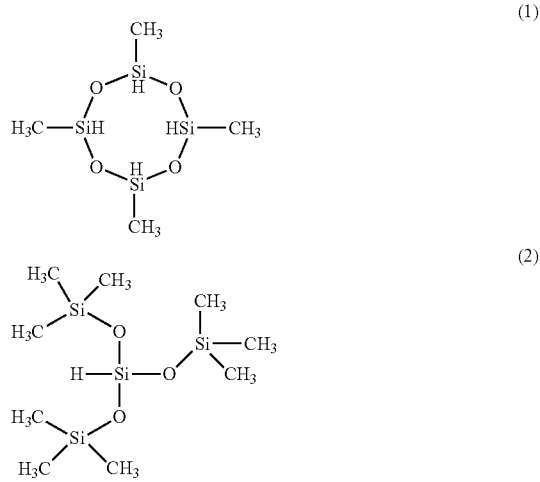

The layer of organic-inorganic material obtained using the organic precursor of the invention is formed by vacuum deposition, consequently it does not include a hydrolyzate of organosilicon compound and therefore differs from the sol-gel coatings obtained by a liquid process.

The duration of the deposition process, the flow rates and pressures are adjusted to obtain the desired coating thickness.

Typically, the physical thickness of the protective layer of organic-inorganic material ranges from 20 to 700 nm, preferably 50 to 500 nm, more preferably 70 to 500 nm.

The concentration of each chemical element (Si, O, C, H, N) in the layers of the invention obtained from an organic precursor may be determined using the Rutherford backscattering spectrometry technique (RBS) and elastic recoil detection analysis (ERDA).

In the layers of the invention, the atomic percentage may preferably range:
  for carbon atoms: from 1 to 25%, more preferably from 8 to 25% and even better from 15 to 25%.
  for hydrogen atoms: from 1 to 67%, more preferably from 8 to 40% and even better from 10 to 20%.
  for silicon atoms: from 8 to 33%, more preferably from 5 to 30% and even better from 15 to 25%.
  for oxygen atoms: from 6 to 67%, more preferably from 20 to 60% and even better from 35 to 45%.

The deposition step of the layer of organic-inorganic material in direct contact with the hardcoat will now be described.

As previously mentioned, the deposition step is performed by using the organic precursor or a mixture of organic precursors described above by vacuum vapor deposition under a beam of ionized gas composition.

Preferably, the beam of ionized gas composition is obtained from an ion gun.

According to this embodiment, the deposition is carried out in a vacuum chamber comprising an ion gun directed toward the substrates to be coated, which emits, toward said substrates, a beam of positive ions generated in a plasma within the ion gun. Preferably, the ions issued from the ion gun are particles formed from gas atoms from which one or more electrons have been stripped.

Since the protective layer of organic-inorganic material is formed by vacuum deposition, it does not contain any silane hydrolysate and therefore differs from sol-gel coatings obtained by liquid processing.

In general, the ionized gas composition used during the deposition step of the LI layer comprises oxygen ($O_2$). In an embodiment, it can be a mixture of $O_2$/Ar. Preferably the ionized gas composition from the ion gun comprises only Oxygen.

In another embodiment, the ionized gas comprises $N_2$.

The organic precursor or mixture of organic precursors, is introduced, in a gaseous state into the vacuum chamber, preferably in a direction that crosses the ion beam, and is activated under the effect of the ion gun. In other words, it is preferably not vaporized inside the vacuum chamber. The feed of the precursor or mixture of precursors of the multilayered interferential coating is preferably located a distance away from the exit of the ion gun preferably ranging from 30 cm to 200 cm.

This deposition technique using an ion gun and a gaseous precursor, sometimes referred to as "ion beam deposition", is especially described in U.S. Pat. No. 5,508,368.

According to an embodiment of the invention, the ion gun is the only place in the chamber where a plasma is generated.

According to another embodiment of the invention, a plasma coming from the ion gun is present in the chamber.

The ions may, if required, be neutralized before they exit the ion gun. In this case, the bombardment is still considered to be ion bombardment. The ion bombardment causes atomic rearrangement in and a densification of the layer being deposited, tamping it down while it is being formed.

During the implementation of the process according to the invention, the surface to be treated is preferably bombarded by ions with a current density generally comprised between 20 and 1000 $\mu A/cm^2$, preferably between 30 and 500 $\mu A/cm^2$, more preferably between 30 and 200 $\mu A/cm^2$ and typically 50 to 200 $\mu A/cm^2$, more preferably 100 to 200 $\mu A/cm^2$ at the activated surface and generally under a residual pressure in the vacuum chamber possibly ranging from $6 \times 10^{-5}$ mbar to $5 \times 10^{-4}$ mbar and preferably from $8 \times 10^{-5}$ mbar to $2 \times 10^{-4}$ mbar.

The lower pressures mentioned above are generally used during IPC (ion pre-cleaning) of the surface before depositing the layers.

The pressure during evaporation and deposition of the precursors are preferably ranging from $10^{-4}$ mbar to $3 \times 10^{-3}$ mbar, more preferably from $3 \times 10^{-4}$ mbar to $1.5 \times 10^{-3}$ mbar.

The evaporation of the precursor materials of the layer of organic-inorganic material, carried out under vacuum, may be achieved using a joule heat source.

The protective layer of organic-inorganic material in direct contact with the siloxane-based hardcoat may also be obtained by deposition under vacuum, in particular by co-evaporation of two different precursors, namely at least one organic compound A as described above, and at least one metallic oxide B, under gaseous form.

In a preferred embodiment, deposition is made with ion beam assistance as disclosed above.

It is considered, in the present application, that metalloid oxides belong to the general category of metallic oxides.

Usable metallic oxides are $SiO_2$, $ZrO_2$, $ZrO$, $TiO_2$, $Tu_2O_5$, $Nd_2O_5$, $HfO_2$, $Pr_2O_3$, $PrTiO_3$, $La_2O_3$, $Nb_2O_3$, $Y_2O_3$, $Al_2O_3$, $WO_3$, $In_2O_3$, $SnO_2$ and mixtures thereof. The preferred metallic oxides are $SiO_2$ and $ZrO_2$.

As previously mentioned, the improved resistance to thermal and hygroscopic stresses of ophthalmic lenses according to the invention is also obtained when an interferential stack, such as an antireflective stack is formed on the lens.

As it is well known in the art, an interferential stack, such as an antireflective stack is made of alternating layers of low refractive index (LI layers) and high refractive index (HI layers), classically of mineral oxides. However, these interferential stacks, preferably antireflective stacks, can comprise layers of organic-inorganic materials or be entirely made of layers of organic-inorganic materials as defined above.

As used herein, a low refractive index (LI) layer is intended to mean a layer with a refractive index of 1.55 or less, preferably lower than 1.50 and even better lower than 1.45, and a high refractive index (HI) layer is intended to mean a layer with a refractive index higher than 1.55, preferably higher than 1.6, more preferably higher than 1.8 and even better higher than 2. Unless otherwise noted, all refractive indexes indicated in the present patent application are expressed at 25° C. and $\lambda = 550$ nm.

Mineral HI layers are classical high refractive index layers and may comprise, without limitation, one or more mineral oxides such as $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nd_2O_5$, $HfO_2$, $Sc_2O_3$, $Pr_2O_3$ or $Al_2O_3$ or $Si_3N_4$, as well as mixtures thereof, preferably $TiO_2$ or $PrTiO_3$.

Mineral LI layers are also well known and may comprise, without limitation, $SiO_2$, $MgF_2$, $ZrF_4$, $AlF_3$, chiolite ($Na_3[Al_3F_{14}]$), cryolite ($Na_3[AlF_6]$), or mixtures thereof, preferably $SiO_2$ or $SiO_2$ doped with $Al_2O_3$. Generally, HI layers have a physical thickness ranging from 10 to 120 nm, and LI layers have a physical thickness ranging from 10 to 100 nm.

Preferably, the total physical thickness of the interferential coating, preferably an antireflection coating is lower than 1 micrometer, more preferably lower than or equal to 500 nm and even better lower than or equal to 250 nm. The total physical thickness of the interferential coating, preferably the antireflection coating, is generally higher than 100 nm, preferably higher than 150 nm.

The interferential coating, preferably an antireflection coating, is generally applied by vacuum deposition according to one of the following techniques: i) by evaporation, optionally assisted by ion beam; ii) by ion-beam spraying; iii) by cathodic sputtering; iv) by chemical vapor deposit assisted by plasma.

In addition to vacuum deposition, the interferential coating, preferably an antireflection coating, can also be applied by depositing a liquid solution, preferably by a spin coating process. As an example, it is possible to apply an inorganic layer by the sol/gel route, for example from a tetraethoxysilane hydrolysate.

A preferred purely mineral antireflection stack comprises a stack of four layers formed by vacuum deposition, for example a first $SiO_2$ layer having an optical thickness of about 100 to 160 nm, a second $ZrO_2$ layer having an optical thickness of about 120 to 190 nm, a third $SiO_2$ layer having an optical thickness of about 20 to 40 nm and a fourth $ZrO_2$ layer having an optical thickness of about 35 to 75 nm.

As indicated above, the interferential stack, preferably antireflective stack, can be partly or entirely made of alternating LI layers and HI layers of organic-inorganic materials as disclosed above.

When the first layer of the interferential stack, preferably an antireflective stack, i.e. the layer of the stack closest to the hardcoat, preferably a LI layer, is an organic-inorganic layer, it can constitute the protective layer of organic-inorganic material in direct contact with the hardcoat according to the invention.

In one embodiment of the invention, the interferential stack, preferably an antireflective stack, is a sandwich structure which comprises at least one inorganic layer, inserted between two layers of organic-inorganic material, one of the layer of organic-inorganic material constituting the protective layer of organic-inorganic material in direct contact with the hardcoat according to the invention.

In a preferred embodiment, the protective organic-inorganic layer in direct contact with the hardcoat is an organic-inorganic $ZrO_2$ (ZrOSiCH) layer resulting from the co-deposition under ion beam assistance in vapor phase of an organic material, as disclosed above, and $ZrO_2$ by electron beam deposition. The central inorganic layer is an electron beam deposited $ZrO_2$ layer and the last layer is an organic-inorganic $SiO_2$ layer (Designated as SiOCH layer).

Interferential stack, preferably antireflective stacks, with multiple sandwich structures, as above, can also be used.

In another embodiment, the interferential stack, preferably the antireflective stack, is solely comprised of layers made of an organic-inorganic material as defined above, a layer of the stack constituting the protective layer of organic-inorganic material in direct contact with the hardcoat, said layer being generally a LI layer.

The invention is illustrated in a non limiting way by the following examples.

EXAMPLES

1. General Procedures
1.1. Substrate and Hardcoat

The substrates used were flat disks (65 mm in diameter) made of polymer CR39® from PPG covered by an about 3 μm thick organosilicon hardcoat as disclosed in the experimental section of the patent application WO-2010/109154.

The hard coat is the one disclosed in example 3 of EP0614957.

1.2. Deposition

The organic-inorganic layers were deposited in a pilot box coater system (Boxer pro, Leybold Optics). The system was equipped with an electron-beam (e-beam) evaporator which was applied to evaporate $ZrO_2$ and $SiO_2$ pellets from a crucible. A quartz crystal microbalance (QCM) was used to monitor the growth rate. The base pressure ($<10^{-5}$ Torr/ 13.33 Pa) was obtained via a turbomolecular pump.

In order to deposit organic-inorganic layers, organosilicon precursor is introduced via a side part, away from the ion source, using a low-vapor pressure mass flow controller (Model 1150, MKS Instruments). Pure oxygen (99.98%) was injected through an End-Hall (EH-1000, Kaufman and Robinson, Inc.) ion source. Oxygen flow and anode current ($I_A$) were set at chosen values while the discharge and filament voltages were automatically adjusted by the power supply.

Inorganic coatings ($SiO_2$, $ZrO_2$) were deposited using electron-beam (e-beam) evaporation with and without ion source assistance (IAD).

1.3. Humidity Test

The samples where placed in an enclosure containing an air atmosphere of 100% RH (Relative Humidity) and heated to temperatures of 60° C. or 80° C. for duration of 2 hours, 90 hours and up to 150 hours.

At the end of the test, cracks occurrence, both in the hardcoat and the layer, was determined by visual inspection of the samples using a microscope.

As, in the examples, the hard coat has a thickness of 3 to 3.5 micrometers and the organic-inorganic layer a maximum thickness of 500 nm, the crackings are thinner and less visible in the organic-inorganic layer than in the hard coat and are consequently less disturbing for a wearer.

Profilometry measurements can also be done. According to those measurements a stylus is moved at the surface of the sample and the differences in vertical position are noted. When those measurements are implemented on a sample having only crackings in the hard coat, the profile should stay flat.

It is also possible to use SEM (Scanning electron microscopy).

1.4. Optical Characterization

Refractive index, n, and the thickness, $d_f$, of deposited films were obtained by variable angle spectroscopic ellipsometry (VASE) using a J.A. Woollam RC2 (2 rotating compensators) ellipsometer. The measurements were performed at different angles of incidence from 45° to 75° with 10° intervals on samples deposited on silicon substrates. The ellipsometric model was a Gen-Osc layer consisting of Gaussian and Tauc-Lorentz oscillators and a surface roughness layer. Using the deposited mass measured with the Quartz Crystal Microbalance (QCM), its area and the film's thickness measured by ellipsometry, we calculated the density of the single layers. Extinction coefficient k can also be measured by this method.

Haze measurements were performed before and after the aging tests using Lambda 1050 (Perkin Elmer Inc.) spectrophotometer equipped with an integration sphere and an InGaAs detector. The light sources used were deuterium and halogen lamps. The haze coefficient was calculated using:

$$\text{Haze} = \{\int_{380}^{780} T_{\text{diff}}(\lambda) d\lambda\} / \{\int_{380}^{780} T_{\text{tot}}(\lambda) d\lambda\} \quad (1)$$

Where $T_{\text{diff}}(\lambda)$ is the spectrum measured using the light trap, which removed the direct transmission from the measurement and only allowed in the diffuse part. $T_{\text{tot}}(\lambda)$ was measured with a white standard and it included both direct and diffuse transmission.

1.5. Mechanical Characterization

Mechanical characterization of the layer is made using a silicon plano support of 50 micrometers on which a protective layer is deposited in the same conditions as the protective layer is deposited on an ophthalmic lens. The measurement is made on a single monolayer of the protective layer.

Mechanical properties, namely the hardness (H), the reduced Young's modulus Er and the elastic recovery (% R) were obtained via nanoindentation using a Hysitron Triboindenter. The applied load varied from 0.1 to 9.5 mN using a Berkovich tip, calibrated with Fused Quartz standard. The presented results are averages of 50 indentations. The load-displacement curves were analyzed using the Oliver and Pharr methodology.

Contact area for a Berkovich indentor is $A_c=24.56\ h_c^2$. The material hardness is obtained by calculating the ratio of the maximum force applied on the measured surface (contact area between indentor and sample).

$$H = \frac{F_{max}}{A_c}$$

$$h_c = h_{max} - \varepsilon \cdot \frac{F_{max}}{S}$$

and elasticity modulus (Young's modulus) E is deducted from the indentation curve (Force–penetration curve)

$$S = \frac{\partial F}{\partial h} = \frac{2}{\sqrt{\pi}} \cdot E_r \cdot \sqrt{A_c}$$

$$\frac{1}{E_r} = \frac{1-v_i^2}{E_i} + \frac{1-v^2}{E}$$

Er is the reduced modulus,
Ei is the indentor modulus,
v is the Poisson coefficient.

While not preferred, it is possible to implement measurements directly on an ophthalmic lens, with preferably a low curvature. If the ophthalmic lens comprises a stack like an AR coating including a protective layer, it is possible to remove by techniques known in the art, such as by ion beam treatment, the layer(s) deposited above the protective layer and then implement measurements directly on the protective layer.

Example 1

A single protective layer of organic-inorganic material was deposited on the hardcoat formed on a substrate (one face only) using different materials proportions and deposition conditions as indicated in table 1 below, in which OMCTS=Octamethylcyclotetrasiloxane.

For comparison, a hardcoated substrate coated solely with an inorganic $SiO_2$ layer (Sample C1) without any organic-inorganic layer is also tested.

TABLE 1

| Sample | O2 (sccm) | OMCTS (sccm) | Anode current ($I_A$) (A) | Thickness of protective layer (nm) applied | Refractive index n550 |
|---|---|---|---|---|---|
| C1 | 0 | 0 | 0 | 399 | 1.48 |
| 1 | 20 | 3 | 1 | 308 | 1.48 |
| 2 | 20 | 5 | 1 | 347 | 1.47 |

TABLE 1-continued

| Sample | O2 (sccm) | OMCTS (sccm) | Anode current ($I_A$) (A) | Thickness of protective layer (nm) applied | Refractive index n550 |
|---|---|---|---|---|---|
| 3 | 20 | 7 | 1 | 292 | 1.48 |
| 4 | 20 | 10 | 1 | 372 | 1.47 |
| 5 | 20 | 15 | 1 | 326 | 1.47 |
| 6 | 20 | 20 | 1 | 279 | 1.46 |
| 7 | 20 | 25 | 1 | 282 | 1.45 |
| 8 | 20 | 3 | 3 | 243 | 1.47 |
| 9 | 20 | 5 | 3 | 239 | 1.50 |
| 10 | 20 | 7 | 3 | 359 | 1.52 |
| 11 | 20 | 10 | 3 | 483 | 1.52 |
| 12 | 20 | 15 | 3 | 395 | 1.52 |
| 13 | 20 | 20 | 3 | 413 | 1.51 |
| 14 | 20 | 25 | 3 | 423 | 1.51 |

Some of the examples have been subjected to a humidity test (80° C., 100% RH) for 90 hours. Results are given in table 2 below.

TABLE 2

| Sample | E (GPa) | H (GPa) | H/E | Crack occurrence In Hardcoat | Crack occurrence In protective layer |
|---|---|---|---|---|---|
| 1 (invention) | 30.7 | 3.9 | 0.12703 | 0.5 | 0 |
| 2 (comparative) | 13.5 | 2.6 | 0.192593 | 1 | 0 |
| 3 (Comparative) | 12.1 | 2.2 | 0.181818 | 1 | 0 |
| 4 (comparative) | 8.8 | 1.8 | 0.204545 | 1 | 0 |
| C1 (comparative) | 44.1 | 4.2 | 0.095238 | 0 | 1 |
| 8 (invention) | 68.4 | 7.5 | 0.109649 | 0 | 1 |
| 9 (Invention) | 36 | 4.2 | 0.116667 | 0 | 0 |
| 10 (Invention) | 31.5 | 3.8 | 0.120635 | 0 | 0 |
| 11 (Invention) | 26.2 | 3.8 | 0.145038 | 0 | 0 |

0 no cracks
0.5 light cracks
1 cracks

FIG. 1 is a graph of the ratio H/E in function of the Young's modulus E. The samples which have cracked are identified by a X mark.

From the results, it can be seen that for a Young's modulus higher than 20 GPa, preferably of at least 25 GPa, there is obtained a protection of the hardcoat.

Also, for a ratio H/E lower than 0.11, cracks appear in the organic-inorganic layer.

Example 2

Further samples, coated with a different organic-inorganic monolayer obtained by evaporation of DMTS under ionic assistance or with a purely inorganic monolayer, have been subjected to a humidity test in an air atmosphere at 60° C. and 100% RH for 2 hours followed by 80° C. and 100% RH for 2 hours. (Less severe than test of example 1).

| Layer type | Organic-inorganic layers (additional samples) | | | | | | | |
|---|---|---|---|---|---|---|---|---|
| | Organic material deposition | | | Metallic oxide deposition | | | | |
| | $O_2$ flow (sccm) | DMTS* flow (sccm) | $I_{A(Anode\ current\ of\ the\ ion\ gun)}$ (A) | Evaporated Oxide | e-beam current (mA) | Layer thickness (nm) | E (GPa) | H (GPa) | H/E |
| Organic-inorganic SiOCH | 15 | 3 | 3 | No | — | 203 | 51 | 6.3 | 0.124 |
| SiOCH | 15 | 6 | 3 | No | — | 246 | 32 | 4.2 | 0.131 |

Organic-inorganic layers (additional samples)

| Layer type | Organic material deposition | | | Metallic oxide deposition | | Layer thickness (nm) | E (GPa) | H (GPa) | H/E |
|---|---|---|---|---|---|---|---|---|---|
| | $O_2$ flow (sccm) | DMTS* flow (sccm) | $I_{A(Anode\ current\ of\ the\ ion\ gun)}$ (A) | Evaporated Oxide | e-beam current (mA) | | | | |
| SiOCH | 15 | 9 | 3 | No | — | 241 | 31 | 4.2 | 0.135 |
| Organic/inorganic SiOCH | 30 | 3 | 3 | No | — | 195 | 71 | 7.2 | 0.101 |
| SiOCH | 30 | 6 | 3 | No | — | 257 | 26 | 3.4 | 0.130 |
| SiOCH | 30 | 9 | 3 | No | — | 277 | 17 | 2.8 | 0.164 |
| ZrOSiCH | 15 | 3 | 3 | $ZrO_2$ | 72 | 262 | 75 | 4 | 0.053 |
| ZrOSiCH | 15 | 6 | 3 | $ZrO_2$ | 66 | 368 | 38 | 2.8 | 0.073 |
| ZrOSiCH | 15 | 9 | 3 | $ZrO_2$ | 72 | 436 | 26 | 2 | 0.076 |
| ZrOSiCH | 30 | 3 | 3 | $ZrO_2$ | 77 | 307 | 60 | 3.1 | 0.051 |
| ZrOSiCH | 30 | 6 | 3 | $ZrO_2$ | 69 | 401 | 39 | 2.2 | 0.056 |
| ZrOSiCH | 30 | 9 | 3 | ZrO2 | 77 | 497 | 20 | 1.5 | 0.075 |

*Decamethyltetrasiloxane

Inorganic layers

| Type | Oxide | e-beam current (mA) | Ionic assistance | I (A) | O2 flow (sccm) | E (GPa) | H (GPa) | H/E |
|---|---|---|---|---|---|---|---|---|
| eB $SiO_2$ | $SiO_2$ | 50 | no | — | | 38 | 3.6 | 0.095 |
| eB $SiO_2$ + IAD | $SiO_2$ | 50 | yes | 3 | 20 | 46 | 4.1 | 0.0891 |
| eB $SiO_2$ + IAD | $SiO_2$ | 50 | | 3 | 30 | 37 | 3.5 | 0.0946 |
| eB $ZrO_2$ | $ZrO_2$ | 65 | no | — | | 104 | 5.1 | 0.049 |
| eB $ZrO_2$ + IAD | $ZrO_2$ | 65 | yes | 3 | 15 | 83 | 4.3 | 0.0518 |
| eB $ZrO_2$ + IAD | $ZrO_2$ | 65 | Yes | 3 | 30 | 70 | 2.9 | 0.0414 |

Figure 2:
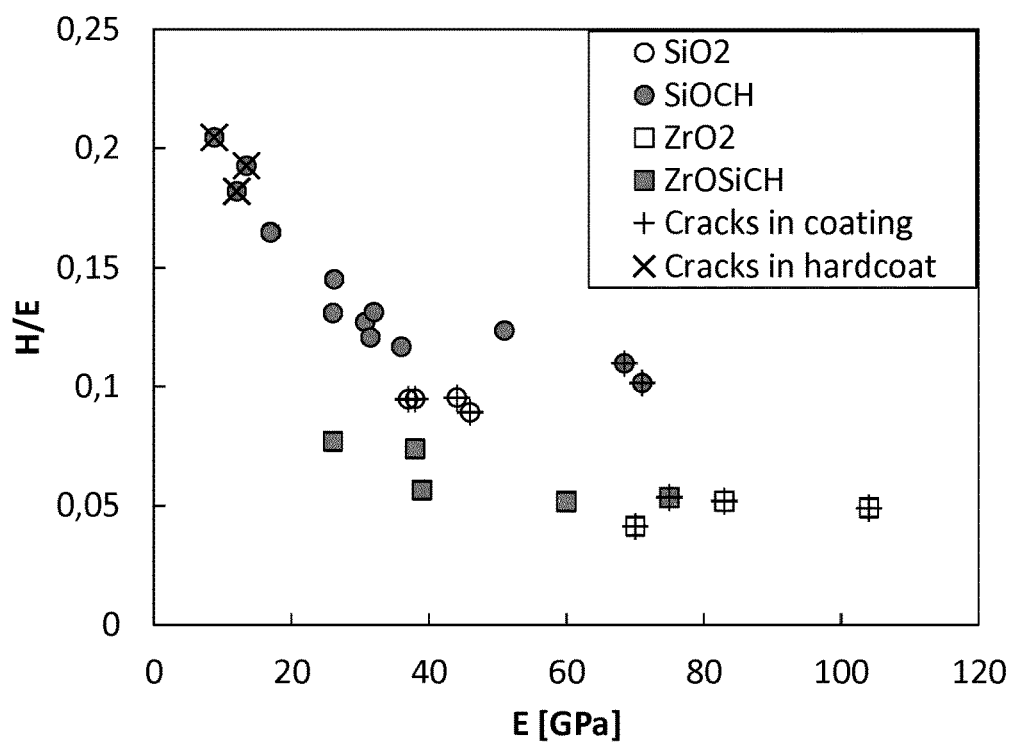
FIG. 2 is a graph similar to FIG. 1, that recaps the results of FIG. 1 and the results of additional ophthalmic lenses according to the invention and comparative lenses which have been subjected to a humidity test in an air atmosphere at 60° C., 100% RH for 2 hours followed by 80° C., 100% RH for 2 hours.

Results are shown in FIG. 2 which is a graph of the H/E ratio in function of the Young's modulus E.

FIG. 2 also mentions the results of samples of FIG. 1 (made in more severe conditions).

The mark X indicates a failure in the hardcoat and a mark + indicates a failure in the deposited layer.

This graph clearly shows that to obtain a protection of the hardcoat, a Young's modulus E of the organic-inorganic layer higher than 20 GPa, preferably of at least 25 GPa is required.

Also, the graph shows that for avoiding cracking of the protecting layer itself, the Young's modulus shall not exceed 40 GPa, preferably 35 GPa, especially for samples with SiOCH layer.

For sample with ZrOSiCH, the Young's modulus shall preferably not exceed 60 GPa.

Example 3

Antireflecting stacks have been deposited on same hard-coated substrate as previous examples with materials and conditions mentioned in table 3 below:

TABLE 3

| Sample n° | Filter | Layer Material | n (550 nm) | Thickness (nm) | $I_{emiss}$ (A) (anode of ion gun) | $O_2$ flow (sccm) | Organic material DMTS* flow (sccm) | Evaporated inorganic material |
|---|---|---|---|---|---|---|---|---|
| 1 | inorganic AR deposited on organic-inorganic layer | Organic-inorganic SiOCH (on hard coat) | 1.54 | 262 | 3 | 15 | 6 | — |
| | | $ZrO_2$ | 1.98 | 122 | — | — | — | Inorganic Zirconium oxide |

TABLE 3-continued

| Sample n° | Filter | Layer Material | n (550 nm) | Thickness (nm) | I$_{emiss}$ (A) (anode of ion gun) | O$_2$ flow (sccm) | Organic material DMTS* flow (sccm) | Evaporated inorganic material |
|---|---|---|---|---|---|---|---|---|
| | | SiO$_2$ | 1.47 | 148 | — | — | — | SiO$_2$ |
| | | ZrO$_2$ | 1.98 | 122 | — | — | — | Inorganic Zirconium oxide |
| | | SiO$_2$ (top layer) | 1.47 | 148 | — | — | — | SiO$_2$ |
| 2 | All layers organic-inorganic | Organic-inorganic ZrOSiCH (on hard coat) | 1.79 | 140 | 3 | 15 | 3 | Zirconium oxide |
| | | organic-inorganic SiOCH | 1.48 | 130 | 3 | 15 | 3 | — |
| | | organic-inorganic ZrOSiCH | 1.79 | 72 | 3 | 15 | 3 | Zirconium oxide |
| | | organic-inorganic SiOCH (top layer) | 1.48 | 89 | 3 | 15 | 3 | — |
| 3 | Sandwich | Organic-inorganic ZrOSiCH (on hard coat) | 1.66 | 75 | 3 | 15 | 6 | Zirconium oxide |
| | | e-beam ZrO$_2$ | 1.98 | 81 | — | — | — | Zirconium oxide |
| | | Organic-inorganic SiOCH (top layer) | 1.48 | 90 | 3 | 15 | 3 | |

In table 3, "—" Means "None"

In sample n°1, the organic-inorganic SiOCH layer obtained solely by evaporation deposition of DMTS under ionic assistance (without concomitant evaporation of inorganic material) constitutes the protective organic-inorganic layer according to the invention and the AR stack deposited thereon is a purely non-organic stack.

This SiOCH layer, due to its relatively high thickness has little effect on the AR properties of the material.

However, this SiOCH layer could be also considered as part of the AR stack. In this case, it would be considered as the first layer of the AR stack.

In sample n°2, an entirely organic-inorganic layer AR stack has been deposited and the 1st organic-inorganic layer on the hardcoat (on HC) constitutes the protective organic-inorganic layer according to the invention.

In sample n°3, the AR stack is a sandwich stack in which a non-organic layer is inserted between two organic-inorganic layers. The organic-inorganic layer on the hardcoat (on HC) constitutes the protective organic-inorganic layer according to the invention.

These samples have been submitted to a humidity test in an atmosphere of air at 60° C. and a relative humidity RH of 100% during 125 hours.

Results are shown in table 4 below:

| Sample no | Cracks occurrence | Haze % |
|---|---|---|
| 1 | No crack in the hardcoat Cracks and delamination in the AR stack | 2.23 |
| 2 | No crack in the hardcoat and in the AR stack | 0.057 |
| 3 | No crack in the hardcoat and in the AR stack | 0.046 |

Example 4 (Comparative)

Example 1 of patent application WO2013098351 is reproduced.

According to this example, an antireflection stack ZrO$_2$ (20 nm)/SiO$_2$ (25 nm)/ZrO$_2$ (80 nm)/ITO (6 nm) and an organic-inorganic layer of 85 nm thickness is applied as the upper layer of the antireflection stack.

After 2 hours 80° C., 100% humidity, cracks appear in the hard coat.

The invention claimed is:

1. An ophthalmic lens having an increased resistance to thermal and hygroscopic stresses, said ophthalmic lens comprising a substrate, at least one main face of which is coated with a siloxane-based anti-abrasion hardcoat, wherein said ophthalmic lens further comprises at least one protective layer of an organic-inorganic material directly in contact with said hardcoat, said protective layer of an organic-inorganic material having a Young's modulus higher than 20 GPa.

2. The ophthalmic lens of claim 1, wherein said protective layer of organic-inorganic material has a Young's modulus which does not exceed 40 GPa.

3. The ophthalmic lens of claim 1, wherein said protective layer of organic-inorganic material has a ratio H/E (indentation hardness/Young's modulus) of at least 0.11 or higher.

4. The ophthalmic lens of claim 1, wherein said protective layer of an organic-inorganic material results from the deposition of an organosilicon compound or a mixture of organosilicon compounds in gaseous state.

5. The ophthalmic lens of claim 4, wherein said protective layer of an organic-inorganic material results from the deposition of an organosilicon compound or a mixture of organosilicon compounds in gaseous state, assisted by an ion source, in absence of an inorganic precursor.

6. The ophthalmic lens of claim 5, wherein at least one additional layer is deposited on said protective layer, said additional layer resulting from the deposition of an inorganic precursor, or a mixture of an inorganic precursor and an organic silicon compound.

7. The ophthalmic lens of claim 4, wherein said protective layer of an organic-inorganic material results from the deposition of an organosilicon compound or a mixture of organosilicon compounds in gaseous state, assisted by an ionic source, in presence of an inorganic precursor.

8. The ophthalmic lens of claim 4, wherein the organosilicon compound is octamethylcyclotetrasiloxane and/or decamethyltetrasiloxane.

9. The ophthalmic lens of claim 1, further comprising an interferential stack.

10. The ophthalmic lens of claim 9, wherein said protective layer of an organic-inorganic material constitutes the first layer of the interferential stack.

11. The ophthalmic lens of claim 9, wherein the interferential stack comprises at least one inorganic layer inserted between two layers of organic-inorganic material, one of the two layers of organic-inorganic material constituting the said protective layer of organic-inorganic material in direct contact with said hardcoat.

12. The ophthalmic lens of claim 9, wherein the interferential stack comprises an alternating stack of layers of low and high refractive index, each layer being made of an organic-inorganic material.

13. The ophthalmic lens of claim 9, wherein the interferential stack is an antireflective stack.

14. The ophthalmic lens of claim 6, wherein the deposition is assisted by an ionic source.

15. The ophthalmic lens of claim 1, wherein said protective layer of organic-inorganic material has a Young's modulus which does not exceed 30 GPa.

16. The ophthalmic lens of claim 1, wherein said protective layer of an organic-inorganic material has a Young's modulus of at least 25 GPa.

17. A process for increasing the resistance to thermal and hygroscopic stresses of an ophthalmic lens comprising a substrate, at least one main face of which is coated with a siloxane-based anti-abrasion hardcoat, comprising:
  depositing directly on said hardcoat a protective layer of an organic-inorganic material having a Young's modulus higher than 20 GPa.

18. The process of claim 17, wherein said protective layer of organic-inorganic material has a Young's modulus which does not exceed 40 GPa.

19. The process of claim 17, wherein the deposition of said protective layer of organic-inorganic material comprises depositing an organosilicon compound or a mixture of organosilicon compounds in gaseous state, optionally in presence of an inorganic precursor.

20. The process of claim 17, wherein said protective layer of an organic-inorganic material has a Young's modulus of at least 25 GPa.

* * * * *